J. T. LYNAM.
Grain-Drill.

No. 166,997.  Patented Aug. 24, 1875.

WITNESSES:  INVENTOR:
E. Wolff  John T. Lynam
A. F. Terry  BY
  ATTORNEYS.

N. PETERS, PHOTO-LITHOGRAPHER, WASHINGTON, D. C.

UNITED STATES PATENT OFFICE.

JOHN T. LYNAM, OF LOUISVILLE, KENTUCKY.

IMPROVEMENT IN GRAIN-DRILLS.

Specification forming part of Letters Patent No. 166,997, dated August 24, 1875; application filed June 5, 1875.

*To all whom it may concern:*

Figure 1:
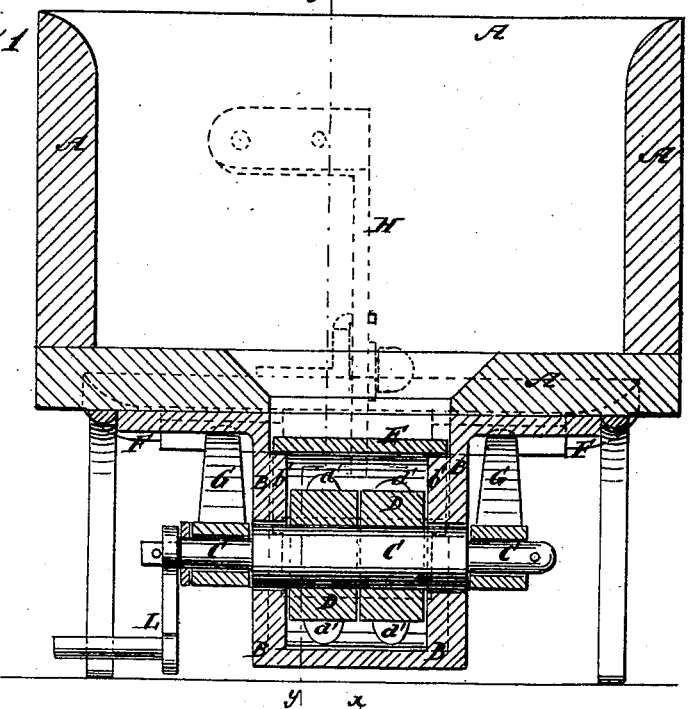
Figure 2:
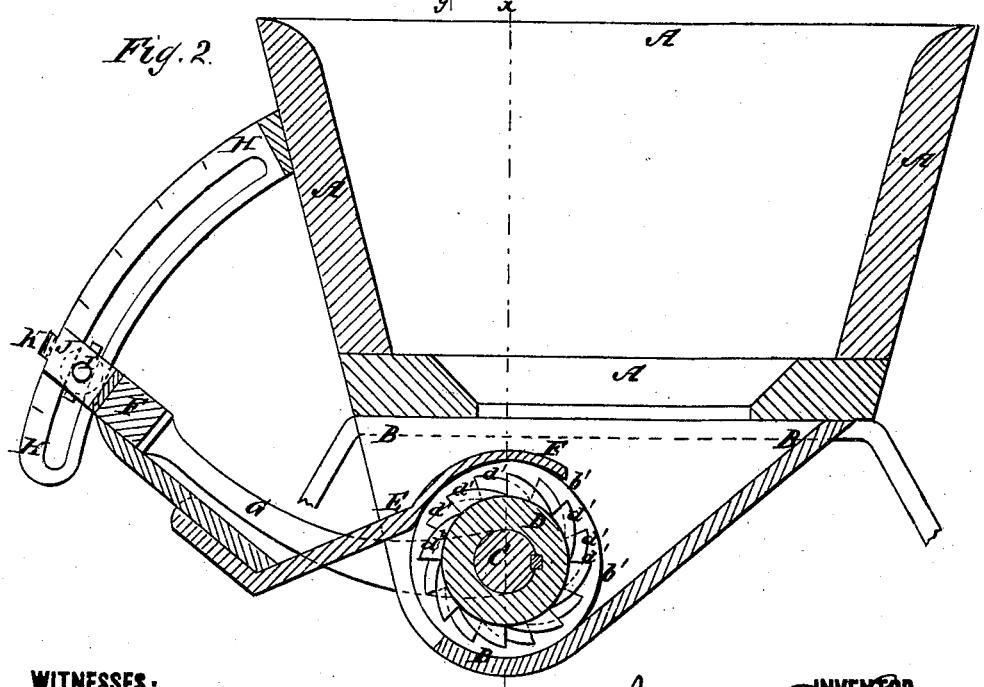

Be it known that I, JOHN T. LYNAM, of Louisville, in the county of Jefferson and State of Kentucky, have invented a new and useful Improvement in Grain-Drills, of which the following is a specification:

Figure 1 is a vertical section of my improved device, taken through the line $x\, x$, Fig. 2. Fig. 2 is a vertical section of the same, taken through the line $y\, y$, Fig. 1.

Similar letters of reference indicate corresponding parts.

The invention will first be described in connection with drawing, and then pointed out in the claims.

A represents the seed-box or hopper of the machine, which may be of any desired length, and in the bottom of which is formed an opening for the seed to pass into the seed-dropping device. To the bottom of the hopper A is attached a metallic box, B, which is made with an open top and open forward side, and with an inclined rear side and concaved bottom, as shown in Fig. 2. The box B is made with flanges at its upper edge, to receive the bolts by which it is secured to the hopper A. C is a shaft that passes through the lower part of the box B, and upon it, within the box B, are placed one or more wheels, D, which are made with projections or buckets $d'$, which are made flat or concave upon their forward sides and rounded or inclined upon their rear sides. The wheels D are keyed to the shaft C, so that they may be carried around by and with the said shaft in its revolution. As the wheels D revolve the buckets $d'$ take the seed and carry it up over the top of the said wheels, and allow it to tumble down the forward side of the wheels into the conductor-spout, by which it is conducted to the ground, the rounded rear sides of the buckets $d'$ scattering the seed effectually. (The conductor-spout is not shown in the drawing.) Upon the inner surface of the sides of the box B, around the bearings for the shaft C, are formed circular projections or shoulders $b'$, which are made slightly eccentric, the upper radiuses being a little longer than the rear radiuses. Upon the curved shoulders $b'$ rest the edges of a curved plate, E, the outer part of which projects outward, is bent upward, and is attached to the cross-bar F, either directly or by the interposition of a wooden connecting-piece. To the cross-bar F are attached two or more arms, G, which are curved to pass in beneath the bottom of the hopper A, and have holes formed in them to receive the shaft C, upon which they are secured by pins. The arms G are secured to the bar F, and, having a common center in the shaft C, control and regulate the equal movement of the circular plate E. H is a bar, one end of which is rigidly attached to the side of the hopper A. The bar H is curved upon the arc of a circle, having its center in the axis of the shaft C, and is slotted longitudinally to receive the hand-screw I, which passes through it, and screws into the arm J, attached to the cross-bar F in such a position as to move along the side of the bar H when the said cross-bar is moved to adjust the plate E, to regulate the amount of seed dropped. The arm J is provided with an index, K, that points to division-marks upon the side of the bar H, to indicate the amount of seed the machine will drop to an acre when the plate E is adjusted in any particular position. The shaft C may be driven by any well-known device, as a pulley and belt or an endless chain worked from the axle-shaft.

Having thus described my invention, I claim as new and desire to secure by Letters Patent—

1. The combination of the box B, the dropping-wheels D $d'$, the shoulders $b'\, b'$, and the valve or circular plate E with the seed-hopper A, the cross-bar F, and the pivoted arms G, for controlling and equalizing the feed, substantially as herein shown and described.

2. The combination of the dropping-wheels D $d'$, the valve or circular plate E, the cross-bar F, and the pivoted arms G with the curved and slotted bar H, arm J, and the index K, substantially as herein shown and described.

JOHN T. LYNAM.

Witnesses:
A. G. MUNN,
W. G. MUNN.